United States Patent
Magno, Jr.

(10) Patent No.: US 7,394,021 B2
(45) Date of Patent: Jul. 1, 2008

(54) ROTATABLE LIQUID-TIGHT CONDUIT CONNECTOR ASSEMBLY

(76) Inventor: Joey D. Magno, Jr., 1231 Beaver Trail Dr., Cordova, TN (US) 38016

( * ) Notice: Subject to any disclaimer, the term of this patent is extended or adjusted under 35 U.S.C. 154(b) by 0 days.

(21) Appl. No.: 11/710,831

(22) Filed: Feb. 26, 2007

(65) Prior Publication Data
US 2007/0246258 A1    Oct. 25, 2007

Related U.S. Application Data

(60) Provisional application No. 60/793,441, filed on Apr. 20, 2006.

(51) Int. Cl.
*H02G 3/18* (2006.01)
(52) U.S. Cl. .......... 174/59; 174/135; 174/68.1; 174/481; 285/194; 439/207
(58) Field of Classification Search .......... 174/135, 174/152 G, 59, 151, 651, 659–668, 70 C, 174/21 R, 68.1, 47, 481; 285/194; 439/578, 439/583, 584, 462, 581, 207; 52/220.7
See application file for complete search history.

(56) References Cited

U.S. PATENT DOCUMENTS

| | | | |
|---|---|---|---|
| 1,880,098 A | 9/1932 | Mair | |
| 2,447,947 A | 8/1948 | Larson et al. | |
| 2,972,002 A * | 2/1961 | Wayman | 174/653 |
| 3,064,998 A | 11/1962 | Syverson | |
| 3,726,547 A | 4/1973 | Cox, Jr. | |
| 3,771,819 A | 11/1973 | Hitchins, III et al. | |
| 4,077,657 A | 3/1978 | Trzeciak | |
| 4,673,234 A | 6/1987 | Lewis | |
| 4,842,548 A | 6/1989 | Bolante | |
| 4,856,825 A | 8/1989 | Blakely | |
| 4,995,832 A * | 2/1991 | Thommen et al. | 439/578 |
| 5,064,226 A | 11/1991 | Klas | |
| 5,180,317 A | 1/1993 | Franks, Jr. | |
| 5,261,839 A | 11/1993 | Franks, Jr. | |
| 5,390,965 A | 2/1995 | Few | |
| 5,586,791 A | 12/1996 | Kirchner et al. | |
| 5,866,853 A * | 2/1999 | Sheehan | 174/653 |
| 5,984,696 A | 11/1999 | Lee | |
| 6,034,326 A * | 3/2000 | Jorgensen | 174/660 |
| 6,095,713 A | 8/2000 | Doyle et al. | |
| 6,114,631 A | 9/2000 | Gretz | |
| 6,203,370 B1 | 3/2001 | Lee | |
| 6,343,963 B1 | 2/2002 | Bronk | |

(Continued)

OTHER PUBLICATIONS

RACO Catelog, printed on Oct. 26, 2006, p. B60, www.aifittings.com/whnew10.htm, printed on Oct. 26, 2006.

*Primary Examiner*—Dhiru R Patel
(74) *Attorney, Agent, or Firm*—Hoffmann & Baron, LLP

(57) ABSTRACT

The conduit assembly includes two mateable generally cylindrical conduit connector bodies with a longitudinal internal bore extending therethrough. The connector bodies include a locking surface for joining and retaining the bodies together at a desired angle. One connector body is externally threaded and the other provides an external snap-on attachment mechanism. Moreover, a gland nut is provided with an internally threaded surface and a snap-on attachment mechanism. The gland nut is slidably positioned over and attached to the connector bodies via snap-on attachment or screw attachment. The gland nut secures and retains the connector halves together at the desired position.

20 Claims, 4 Drawing Sheets

U.S. PATENT DOCUMENTS

| | | |
|---|---|---|
| 6,352,439 B1 | 3/2002 | Stark et al. |
| 6,538,201 B1 | 3/2003 | Gretz |
| 6,581,974 B1 | 6/2003 | Ragner et al. |
| 6,596,939 B1 | 7/2003 | Gretz |
| 6,619,872 B2 | 9/2003 | Crorey et al. |
| RE38,294 E * | 11/2003 | Nattel et al. .................. 174/59 |
| 6,642,451 B1 | 11/2003 | Gretz |
| 6,935,890 B1 | 8/2005 | Gretz |
| 7,048,561 B1 | 5/2006 | Elbaz |
| 2003/0137148 A1 | 7/2003 | Andre et al. |
| 2004/0046386 A1 | 3/2004 | Chien et al. |
| 2004/0048514 A1 | 3/2004 | Kodaira |

* cited by examiner

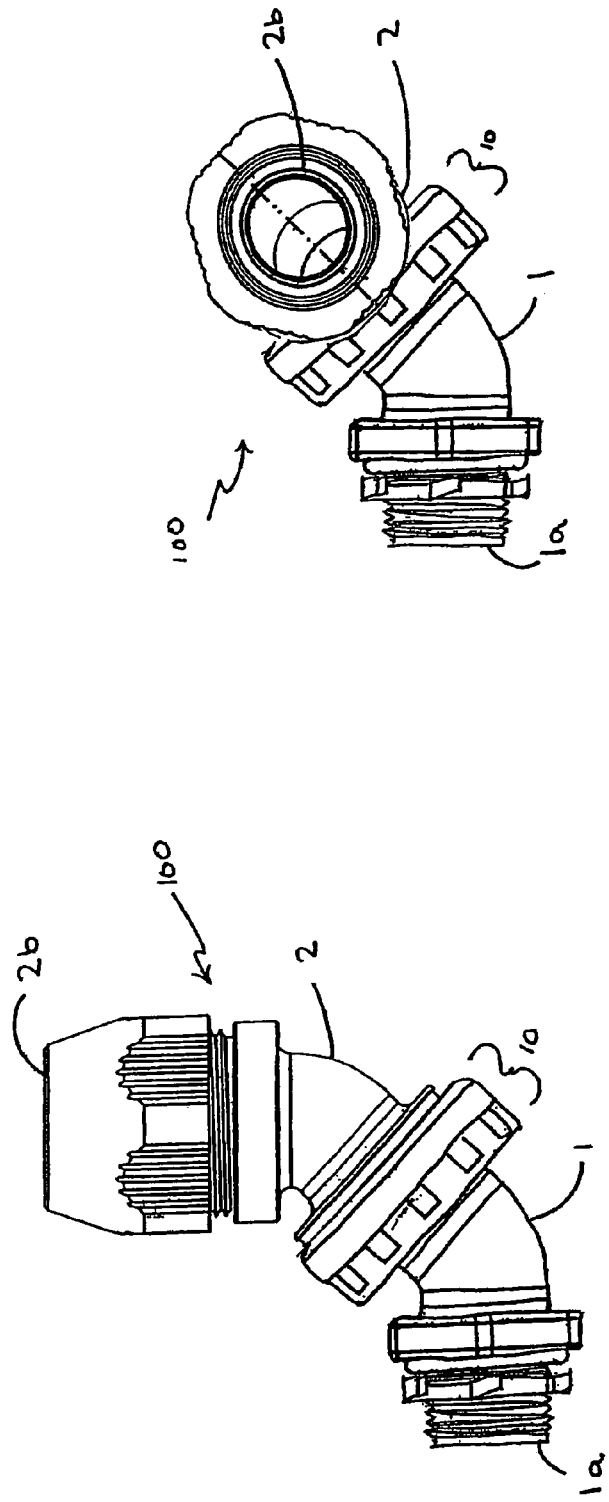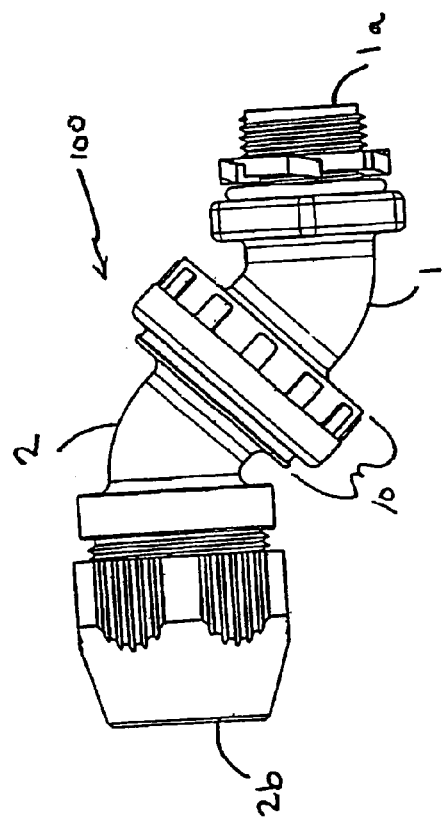

ROTATABLE LIQUID-TIGHT CONDUIT CONNECTOR ASSEMBLY

CROSS-REFERENCE TO RELATED APPLICATION

This application claims the benefit of U.S. Provisional Application No. 60/793,441, filed Apr. 20, 2006.

FIELD OF THE INVENTION

The present invention relates generally to a conduit fitting for receiving electrical wires therethrough. More particularly, the invention relates, generally, to a liquid tight conduit fitting that allows the installer to insert wires in a straight position and then rotate and secure the fitting to a desired angle and to a method of connecting.

BACKGROUND OF THE INVENTION

In electrical wiring, conduit fittings are used for connecting electrical conduits or various other cables to outlets, fixture boxes, junction boxes, and the like. In many applications, it is often desirable to have a conduit fitting that includes a bend or an angle.

Various conduit fittings have been developed that can be rotated for use as both a straight conduit fitting and an angled conduit fitting. U.S. Pat. No. 954,504 to W. F. Drew describes a pipe coupling device with a threaded nut having a flange that cooperates with the flange of a fitting with a bend. However, such coupling device does not prevent loosening or rotational movement of one fitting against another fitting.

Similarly, U.S. Pat. No. 1,880,098 to J. E. Mair, U.S. Pat. No. 4,856,825 to Blakely, and U.S. Pat. No. 6,114,631 to Gretz, all disclose a connector fitting for conduits with a variation of a nut member holding two conduits. However, none of these references provide for a connector which will facilitate a tight clasp of two conduits to prevent their inter-rotation during installation or at a time thereafter, as well as maintain the conduits in place should the nut member be slightly loosened.

Further, many of the prior conduit fittings are difficult to install due to their complexity. In terms of steps for installing prior conduit fittings, the installer must hold the conduit fitting in one hand at the desired angle, and with the other hand manipulate the securing mechanism for locking the conduit fitting at a desired angle. Additionally, as the prior art references mentioned above indicate, those fittings provide a nut to secure the fitting at the desired angle. However, over time, the nut loosens allowing the fitting to inter-rotate or change positions.

Other prior art fittings include a snap-on feature to snap the two sections of the fitting together at the desired angle as shown in the U.S. Pat. No. 5,064,226 to Klas. However, the snap-on feature also results in a loose connection between the fitting pieces allowing the fitting pieces to change positions relative to each other.

Further, prior art fittings mentioned above and other fittings in the industry include a variety of separate pieces which must be assembled on-site. As there are several small separate pieces in the prior art fittings, which are easy to lose and hard to handle, the fitting itself is difficult to put together and, often, certain pieces such as the nut may become lost while trying to assemble the fitting.

Some of the fittings also fail to provide a water resistance feature as a tradeoff of their feature for making various rotational angle positions possible during assembly. Moreover, these prior conduit fittings are often complex and/or difficult to manufacture.

Accordingly, it is desirable to provide a conduit fitting which can be installed at any desired angle and retained at that angle until purposefully moved. Further, it is desirable to have a fitting assembly including a means of securing the fitting so that it will not come off during shipment and loosen after installation. In addition, it is desirable to have a fitting assembly that is pre-assembled at the manufacturing site to prevent loss of important pieces, yet allow disassembly if required. Finally, it is desirable to provide a conduit fitting assembly that can be easily and readily assembled, while preventing water from entering there through.

SUMMARY OF THE INVENTION

The present invention is directed to a rotational liquid tight conduit connector assembly fitting for extending a plurality of wires, cords or cables therethrough. The invention includes a generally cylindrical body 61, another generally cylindrical body 62 and a gland nut. The present invention includes a nut retention feature and an alignment feature to retain the connector fitting at the desired angle. Further, the present invention includes an overhang mating surface with an indented mating surface that concurrently provides for a liquid tight seal for the fitting seams.

Specifically, one embodiment of the present invention includes a gland nut of annular shape having two spaced apart ends and a sidewall therebetween. The sidewall has an internal surface including an internally threaded portion near one end and a snap-on portion near the other end. The internally threaded portion is telescopically screw attached to the externally threaded surface of the first body. The snap-on portion includes a series of inwardly projecting fingers slideably positioned over the rim of the second body and snap-on attached thereto.

Another embodiment of the invention includes an overhang mating surface and a second mating surface with an indented mating surface. When the first mating surface and the second mating surface are joined together by the gland nut, the overhang mating surface and the indented mating surface are also simultaneously joined to provide for a secure leak-proof connection. A preferred embodiment related to this embodiment includes an o-ring placed between the overhang mating surface and the indentation mating surface to further secure the water-tight connection.

Further, a method of delivering wires through two disconnected conduits separated by non-common axis is provided. In a preferred method, an installer couples a first cylindrical sleeve body with a first disconnected conduit. The external circumferential indentation may be rotatably engaged by an inwardly facing protrusion of a gland nut at the manufacturing site or the installer may snap the pieces together to make sure the pieces do not get lost.

The installer, then, couples a second cylindrical sleeve body with a second disconnected conduit. The gland nut of the first body includes an inner thread that engages with the outer thread of the second body. Next, the installer, rotationally positions the gland nut and the first cylindrical sleeve body to a desired angle to align the inner thread of the gland nut with the outer thread of the second cylindrical sleeve body.

After that, the installer rotates the inner thread around the outer thread to pull the notches of the first and second sleeve bodies together to restrain further torsional movement thereof. Finally, the installer inserts a wire through the ingress end to the egress end, thereby delivering wires through two disconnected conduits separated by non-common axis.

Other advantages and features of the invention will become apparent from the following detailed description, which, taken in conjunction with the annexed drawings, discloses the preferred embodiment of the invention.

BRIEF DESCRIPTION OF DRAWINGS

FIG. 2 is a side elevation view of the assembled conduit apparatus of the present invention showing one member at a 180 degree rotation of the conduit of FIG. 1 about the mating surfaces;

FIG. 3 is a side elevation view of the assembled conduit apparatus of the present invention showing one member at a 90 degree rotation of the conduit of FIG. 1 about the mating surfaces;

FIG. 4 is a side elevation view of the assembled conduit apparatus of the present invention showing one member at a 0 degree rotation of the conduit of FIG. 1 about the mating surfaces;

DETAILED DESCRIPTION OF THE PREFERRED EMBODIMENT

The present invention will be described with respect to several preferred embodiments of FIGS. 1-8.

Figure 6:
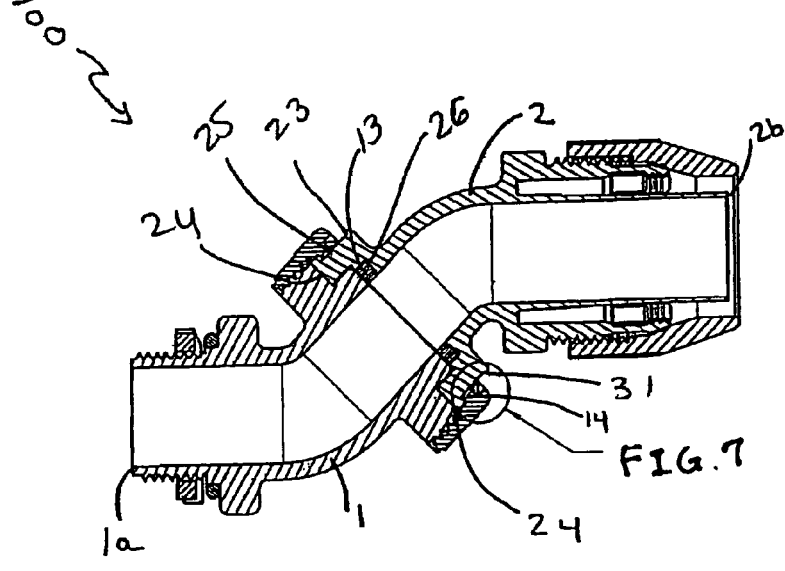
FIG. 6 is a longitudinal cross-sectional view of the assembled conduit apparatus shown in FIG. 5 along the A-A plane.
Figure 7:
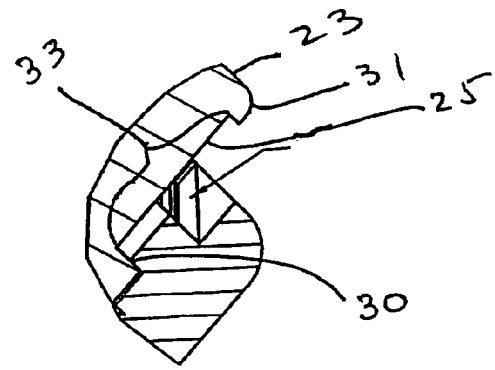
FIG. 7 is a partial enlarged detailed view of a "snap-on" finger assembly of FIG. 6.
Figure 8:
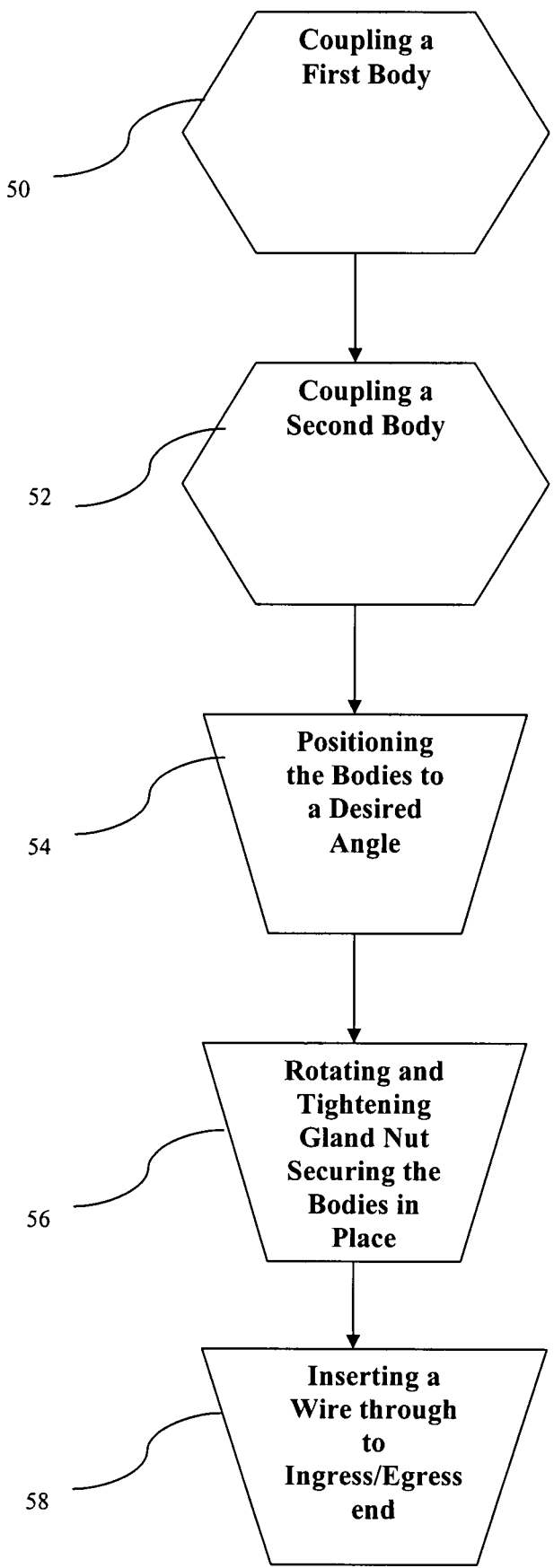
FIG. 8 is a schematic drawing of steps to deliver a wire through two disconnected conduits separated by non-common axis utilizing the embodiment of FIG. 4.

In general, FIGS. 1-7 show a conduit assembly 100 with the features of conduit connector assembly fitting 10 at various rotational settings from 0-360 degrees with respect to the locking faces or mating surfaces 11a, 12a which accommodates a plurality of degrees of separation with respect to the cable receiving end 1a, and cable egress end 2b. Conduits are elongated tubular members used to contain a single or a plurality of electrical cables (not shown) therein and are connected to each other by a conduit connector assembly fitting 10. The conduit is used to run the cable over a longitudinal expanse so as to protect the cables within the conduit. Conduits of this type may be preferably formed of a variety of materials including rigid plastic, elastomeric polymer, ceramic, and metal. FIG. 8 shows the steps to pass a wire or a cable through the two conduits separated by a non-common axis utilizing the apparatus of the present invention.

Figure 1:
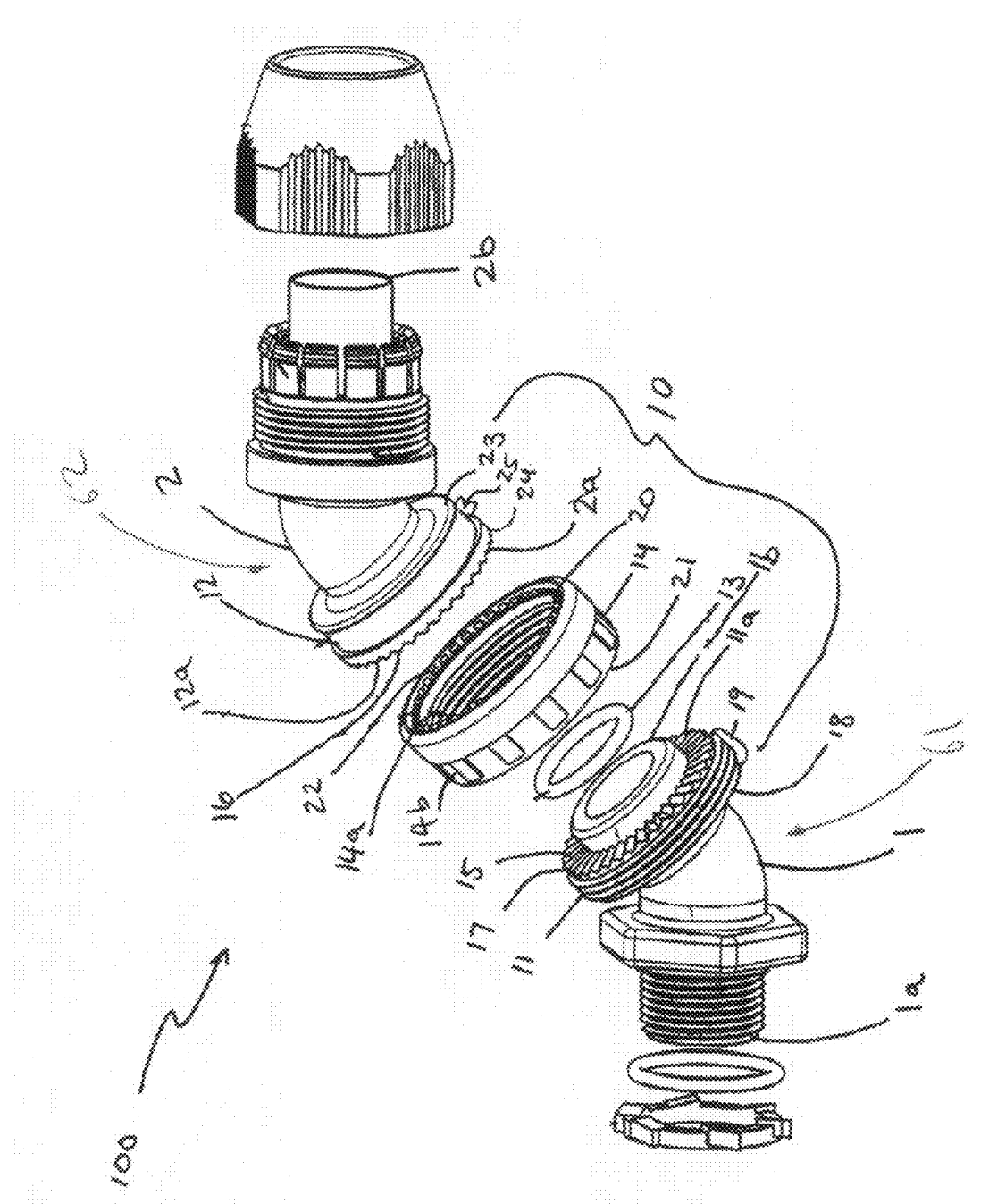
FIG. 1 is an exploded perspective view of a conduit and nut apparatus of a preferred embodiment of the present invention.
Figure 5:
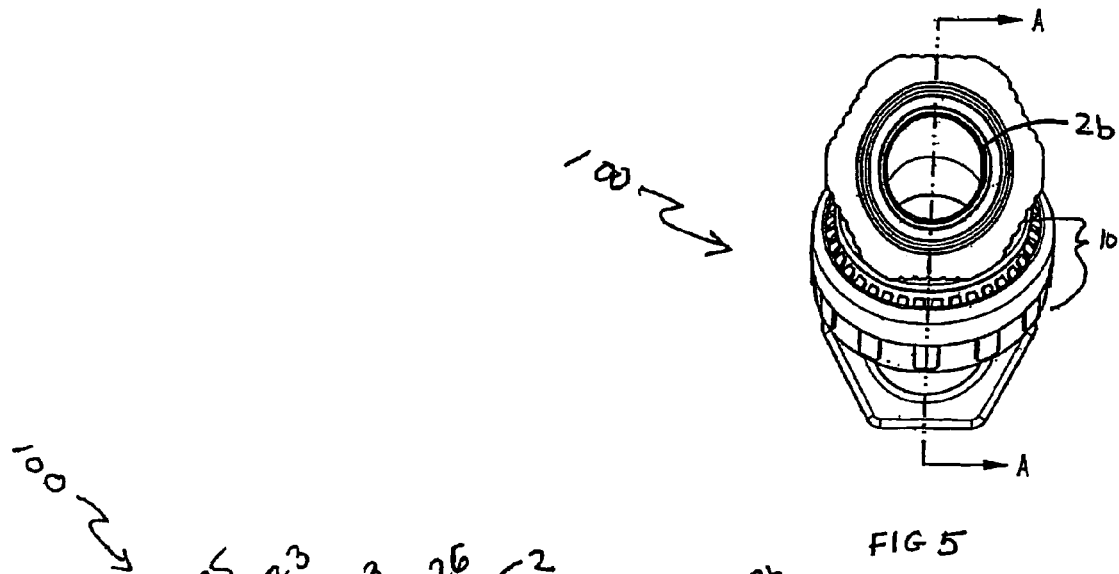
FIG. 5 is a front elevation view of the assembled conduit apparatus shown in FIG. 4.

Describing the Figures with more specificity, FIG. 1 shows conduit assembly 100 at, for purposes of discussion herein, a 0 degree rotation about the mating surfaces, i.e. the cable receiving end 1a is located at the lower left corner of the figure and the cable egressing end 2b is located at the upper right corner of the figure, forming an S-shape in one plane. FIGS. 2-4 show various degrees of rotation depending on the angular position of the conduit assembly 100. FIG. 2, in particular, shows one member of a conduit assembly 100 at a 180 degree rotation about the mating surfaces, i.e. the cable receiving end 1a is located at the lower left and the cable egressing end 2b is located upwardly at a perpendicular thereto, forming an L-shape in one plane. FIG. 3, shows a conduit assembly 100 with one member at a 90 degree rotation about the mating surfaces. Explicitly, the cable receiving end 1a is located at the lower left corner of the figure and the cable egressing end 2b is facing outwardly of the paper and perpendicular thereto in two planes.

However, it may be appreciated that the present invention may be practiced with respect to any angle in between from 0-360 degrees with respect to the locking faces or mating surfaces 11a, and 12a relative to each other for the desired application. Thereby, such wide degree of freedom in placing the mating surfaces at different rotation positions allows placing cable receiving end 1a of elbow 1 and the cable egressing end 2b of elbow 2 at various angles from each other and in various different planes in connection with other conduits (not shown) at different axes.

As shown in FIG. 1, the assembly fitting 10 includes elbows 1 and 2 formed as tubular members with cable receiving ends 1a, 2a for receiving cable therethrough (such as from the conduit). The assembly fitting 10 also includes cable egressing ends 1b, 2b through which the electrical cables extend (such as into a conduit). Alternatively, cable ingress/egress ends could be reversed. Conduit connector assembly fitting 10 of the present invention also includes first alignment connector half 11, a second alignment connector half 12 being generally annular about the exterior surface of elbows 1 and 2 respectively. Alignment connector halves 11, and 12 are generally cylindrical members having two spaced apart ends (17, 18 for connector half 11, and 23, 24 for connector half 12) and an externally threaded sidewall 19 surrounding at least one of them.

In this embodiment, first connector half 11 has an outwardly extending flange portion and a cylindrical externally threaded side wall 19 between ends 17 and 18. First connector half 11 is bored through the center from the attachment end 17 to second end 18 to allow for elbow 1 (or a wire passageway) to extend therethrough. The attachment end 17 has a locking face or mating surface 11a which has a surface profile including teeth-like protuberances and depressions or notches 15 to provide a fast mating surface such as an uneven surface. Additionally, FIG. 1 shows the cylindrical externally threaded sidewall 19 of the first connector half 11 for screw attachment thereto. These halves 11 and 12 are supplemented by a gland nut 14, and an o-ring gasket 13.

The second connector half 12 is similar to the first connector half 11 with an outwardly extending flange portion that includes a second spaced apart end 23, an attachment spaced apart end 24 and side wall 25 therebetween. FIG. 1 also shows the attachment spaced apart end 24 having a locking or second mating surface 12a with teeth-like formation or notches 16, similar to mating surface 11a of first connector half 11. Both mating surfaces 11a and 12a have an inter-engaging design such that, in combination, they provide for alignment and securing of the connector halves 11, 12 at the desired angle and prevent rotational movement of the mating surface 11a and 12a when they are engaged. It is further noted that first and second mating surfaces may be fabricated with friction surface devoid of such teeth-like formation or notches.

Alignment connector halves 11, and 12 may be formed from metal or non-metallic material, such as ceramic, plastic or composites. As shown in FIG. 1, alignment connector halves 11, 12 may be a single molded extension of elbows 1, 2, respectively. However, it is contemplated that the alignment connector halves 11, 12 may be separate fittings that are attached separately to conduits to be joined together.

Gland nut 14 is generally an annular member having two spaced apart ends 20, 21 and a side wall therebetween. The side wall of gland nut 14 includes an internally threaded surface 14a for being telescopically screw attached to sidewall 19 of first connector half 11. Gland nut 14 also includes a plurality of raised surfaces 14b provided about the external surface thereof, to facilitate a gripping surface for screw attachment of the gland nut 14 onto the first connector half 11. Thus, the externally threaded sidewall 19 of the first alignment connector half 11 is designed to mate with internally threaded surface 14a of gland nut 14, wherein the gland nut 14 pulls together or inter-mates the two notches 15 and 16, and assists in retaining the connector halves 11, 12 together at the desired aligned angle.

Further, the gland nut 14 includes a series of inwardly projecting fingers 22 at one end 20 for having the gland nut 14 received into a portion of the second connector half 12 as a snap-on attachment thereto. The fingers 22 project inwardly at a preferred range of angles about the circumferential internal surface of the gland nut 14. The fingers 22 of gland nut 14 have one-way lead-in geometry for providing a one-way slidable attachment over the rim 30 (as shown in FIG. 7) of second connector half 12. This combination allows the gland nut 14 to snap fit to the second connector half 12. Thereafter, the fingers 22 in combination with the rim 30 and rim 31 prevent the gland nut 14 from slidably detaching from the second connector half 12 without excessive manual force. Each of the fingers 22 is preferably a projection fabricated with the gland nut 14 in one piece, which extends from the internal surface of the sidewall 19 at an angle of between about 20 degrees to about 160 degrees from the sidewall toward the center of the gland nut 14, to provide the lead-in geometry and snap-on attachment. Alternatively, the fingers may be substituted by other types of holding mechanism such as guide rails, magnets, rings, e-clips or any other holding mechanism.

It is further noted that the gland nut 14 of the present invention could be retained via the inwardly directed protrusion method or any other method as can be appreciated by a person skilled in the art to be attached on either the first alignment connector half 11 or the second alignment connector half 12 with minor feature adjustments.

Referring to the combination in detail, FIGS. 6 and 7 are cross-sectional views which show indented sidewall 25 inset between the attachment end 24 and second end 23 of the second connector half 12. The ends 23 and 24 and the side wall 25 together define the protruding rims 30, 31, respectively. The rims 30, 31 in combination with the inset sidewall 25 form an indented channel 33 for the fingers 22 of the gland nut 14 to slidably move within. Thus, rims 30, 31 and fingers 22 secured to gland nut 14 cooperatively prevent the gland nut from being removed from the channel 33 without excessive manual force and also allow free rotational movement there inbetween.

As mentioned above, the first alignment connector half 11 includes notches 15 to cooperatively interconnect with the mating surface (surface profile of the locking face) 12a of second connector half 12. By way of example and not by limitation, FIG. 1 shows the actual surface profile of top mating surfaces 11a and 12a having teeth-like notches 15 which radially extends outward from top mating surfaces 11a, 12a. Thus, the mating surfaces provide an alignment and frictionally retaining mechanism to join together the connector halves 11, 12 at the desired angle. Alternatively, such surface retaining mechanism could be performed by other means such as a separate roughening piece, a magnetic part, or a time-delayed adhesive, set screw, pin and hole, key and slot, etc.

As can be seen in FIG. 6, interposed between the connector half 11 and the connector half 12 is an o-ring gasket 13. The o-ring gasket 13 is supported between the cable egressing end 1b of elbow 1 and the cable receiving end 2a of elbow 2. Referring back to FIG. 1, the o-ring gasket 13 is an annular member that is formed of a suitable, resiliently compressible elastomer. Gasket 13 has an outer diameter and an inner diameter similar to those of elbow 1, 2. The cross-sectional view of the engagement of gasket 13 as shown in FIG. 6, teaches gasket 13 seated in a carved out annular groove indent 26 of the interior of second connector half 12 and a raised projected surface 27 of the first connector half 11. Preferably, the o-ring gasket 13 may be pinched in the annular indent 26 so as to prevent loss of the gasket. The space defined by the surface of the annular indent 26 and the projected surface 27 for the gasket 13 is provided with a length that is slightly shorter than the diameter of the gasket 13 to provide a water tight seal between the connector halves 11, 12.

Referring now to FIGS. 1, 6, and 7, the assembly of the conduit connector assembly 10 including the elbows 1, 2 is described. First, the gland nut 14 is slideably positioned over second connector half 12 until the fingers 22 of the gland nut 14 surpass over rim 30 and snap into and seats in channel 33. Once snapped in place, such as during manufacture, the gland nut 14 may slidably rotate within the indented channel 33 between the rims 30, 31. Alternatively, FIG. 6 shows gasket 13 positioned within the annular indent 26 of the interior of second connector half 12 prior to the positioning of the gland nut 14 to provide a water tight seal once the connection assembly fitting 10 is fully assembled.

The connector halves 11 and 12 are positioned at a desired angle with respect to each other. Once the mating surfaces 11a, 12a are properly aligned, they are joined together to lock the connector halves 11, 12 at the desired angle. Next, the gland nut 14 is contacted with the attachment end 17 of first connector half 11. The internally threaded wall 14a of the gland nut 14 is screw attached to the externally threaded sidewall 19 of the first conduit connector half 11 to secure the gland nut 14 to the first connector half 11. Functionally, the gland nut 14 telescopically progresses by rotating around the perimeter of the externally threaded sidewall 19 of first connector half 11, tightening ever closely, and thus, securing the mating surfaces 11a, 12a together. This combination retains the assembly fitting 10 at the designed angle, and prevent further rotation of the elbow 1 and 2. In a preferred embodiment, the cable egressing end 1b of elbow 1 will compressively abut against gasket 13 as the mating surfaces 11a, 12a are drawn together and secured. The gasket 13 compresses and is sandwiched between both the cable egressing end 1b of elbow 1 and the cable receiving end 2a of elbow 2, thereby forming a watertight seal. As a result, the mating surfaces 11a and 12a cooperatively retain the connector halves 11, 12 at the desired angle and position even if gland nut 14 should loosen relative to first connector half 11, due to external forces.

Furthermore, after the gland nut 14 is "snap-on" attached to the second connector half 12, the fingers 22 of gland nut 14 prevent the gland nut 14 from detaching from the second connector half 12. Therefore, gland nut 14 is prevented from separating from the second connector half 12, should the gland nut 14 become loosened during shipping or other outside forces. This allows the installer to change the position of the connector assembly portion 10 of the elbows 1, 2 to the desired angle without fully removing the gland nut 14 from the assembly 10. Essentially, the gland nut 14 will remain attached to second connector half 12 to prevent possible loss or misplacement of parts. Thus described, FIGS. 2-6 show fully assembled conduit assembly 100 and conduit connector assembly fitting 10 at various positions and the manner in which they are assembled.

Referring now to FIG. 8, a method of using the invention to deliver a wire through two disconnected conduits (not shown) separated by non-common axis is provided. As shown in step 50, in a preferred method, an installer couples the first alignment connector half 11 of the first elbow 1 with a disconnected conduit (not shown). At this point, it is noted that the external circumferential indented sidewall 25 is already rotatably engaged by the inwardly facing fingers 22 of the gland nut 14 at the factory to minimize loss. Further, a gasket 13 is also placed or secured within the confines of the annular indent 26 of second connector half 12 at the factory as well.

The installer, then, couples a second elbow 2 with a second disconnected conduit (not shown), wherein the second elbow 2 has another rigid angular elbow shape which includes attachment end with the mating surface 12a, and another cable ingress/egress end (16, 26). In some embodiments, the mating surfaces may be notched.

The installer, then, rotates the spaced apart end of the gland nut 14 and its attached first cylindrical sleeve body elbow 2 to align with the mating surface 11a of the first alignment connector half 11. Once a desired aligning angle for the inner thread 14a of the gland nut 14 and the outer thread 19 of the first cylindrical sleeve body elbow 1 has been achieved, installer pulls the gland nut 14 closer to cover over and engage with the externally threaded sidewall 19. At this point, the installer has the option of pulling through the cable through both elbows 1 and 2 and their respective connected conduits.

Next, the installer rotates the inner thread 14a around the outer thread 19 to pull the mating surfaces (11a, 12a) of the first and second sleeve bodies elbows together to restrain further torsional movement thereof. This, in essence, provides for a positive lock-up position such that even if the gland nut 13 is not tight or becomes loose due to vibration or some external force, the positive position lock up ensures that the position of the connector halves do not change (do not slide to other angles).

Finally, the installer has the option at this point to insert the wire and pulls it through the ingress end 1a out through the egress end 2b.

While the invention has been described in connection with what is present in the considered to be the most practical and preferred embodiment, it is to be understood that the invention is not to be limited to the disclosed embodiment, but, on the contrary, is intended to cover various modifications and equivalent arrangement included within the spirit and scope of the and claims, which scope is to be accorded the broadest interpretation so as to encompass all such modifications and equipment structures as it is permitted under the law.

What is claimed is:

1. A conduit connector assembly fitting comprising:
a first generally cylindrical body with a longitudinal internal bore extending therethrough, the first body having a cable receiving end spaced apart from an attachment end, the attachment end having a first mating surface;
a second generally cylindrical body with a longitudinal internal bore extending therethrough, the second body having an attachment end spaced apart from a cable egressing end, the attachment end of the second body having a second mating surface, the first mating surface and the second mating surface being rotationally intermated and adjacently joined together to prevent further rotation of the bodies; and
a gland nut of annular shape having two spaced apart ends and a sidewall therebetween, the gland nut cooperatively securing the first body and the second body together to prevent separation of the bodies.

2. A conduit connector assembly fitting according to claim 1, wherein said first body has an externally threaded surface adjacent to the attachment end, said second body has an externally protruding rim circumferentially about the attachment end, and said side wall of said gland nut having an internal surface, including an internally threaded portion and a snap-on portion, the internally threaded portion being telescopically screw attached to the externally threaded surface of the first body, the snap-on portion includes a series of inwardly projecting fingers slideably positioned over the rim of the second body and snap-on attached thereto.

3. A conduit connector assembly fitting according to claim 2, wherein said inwardly projecting fingers fit within an external circumferential indentation on said second body, requiring an extensive use of force for separation of said inwardly projecting fingers from said external circumferential indentation.

4. A conduit connector assembly fitting according to claim 1, further comprising:
an o-ring gasket, wherein one of said attachment ends includes a centered sleeve projection having a diameter smaller than the diameter of said attachment end and other of said attachment ends includes an annular recess to accommodate said o-ring gasket within to provide liquid tight seal to the connector apparatus.

5. A conduit connector assembly fitting according to claim 4, wherein said an o-ring gasket is fixed in said annular recess at the time of manufacture, prior to being installed.

6. A conduit connector assembly fitting according to claim 1, wherein each said attachment end includes a raised/recessed central surface, said attachment ends being configured to prevent rotational movement of said sleeve body and said raised/recessed central surface being configured to prevent water leakage.

7. A conduit connector assembly fitting according to claim 1, wherein said gland nut is provided on one of said first and second cylindrical bodies at the time of manufacture, prior to being installed.

8. A conduit connector assembly fitting according to claim 1, wherein said gland nut includes raised external profile to facilitate a gripping surface.

9. A conduit connector assembly fitting according to claim 1, wherein each of said first and second mating surfaces is provided on the same plane as each said respective attachment end of said first and second bodies.

10. A connector apparatus comprising:
a first and a second cylindrical sleeve bodies, each said sleeve bodies having a rigid angular elbow with a cable ingress/egress end and an attachment end, said attachment end including a plurality of v-cut surface notches and at least one of an outer thread or an external circumferentially indented guide adjacent to said notches; and
a ring-shaped gland nut having an inner thread configured to engage with said outer thread and a plurality of inwardly directed snap-in fingers provided adjacent to a rim of said gland nut to engage with said indented guide, wherein rotating said inner thread in a tightening direction around said outer thread pulls said notches together to restrict further torsional movement of said first and second cylindrical sleeve bodies against each other.

11. A connector apparatus according to claim 10, further comprising:
an o-ring gasket, wherein one of said attachment ends includes a central sleeve boss and other of said attachment ends includes an annular recess to accommodate said o-ring gasket and provide liquid tight seal to the connector apparatus.

12. A connector apparatus according to claim 11, wherein said an o-ring gasket is fixed in said annular recess at the time of manufacture, prior to being installed.

13. A connector apparatus according to claim 10, wherein said inwardly directed fingers define a snap-on characteristics in combination with said external circumferential indentation.

14. A connector apparatus according to claim 10, wherein said inwardly directed fingers are provided on said external circumferential indentation, requiring an extensive use of force for separation of said inwardly directed fingers from said indented guide.

15. A connector apparatus according to claim 10, wherein each said attachment end includes at least one of a raised sleeve boss with side wall and a recessed indentation with inner wall configured to engage said side wall and prevent water leakage.

16. A connector apparatus according to claim 15, wherein said side wall and inner wall are filled during formation.

17. A connector apparatus according to claim 10, wherein said ring-shaped gland nut is snapped on one of said first and second cylindrical sleeve bodies at the time of manufacture, to prevent loss during transportation.

18. A connector apparatus according to claim 10, wherein said notches are replaced by magnets.

19. A connector apparatus according to claim 10, wherein said gland nut includes raised external gripping surface to facilitate a firm grasp.

20. A method of delivering wires through two disconnected conduits separated by non-common axis, the steps comprising:

coupling a first cylindrical sleeve body with a first disconnected conduit, said first sleeve body having a rigid angular elbow shape including an attachment end with a first mating surface, a cable ingress/egress end and an external circumferential indentation therebetween;

coupling a second cylindrical sleeve body with a second disconnected conduit, said second sleeve body having another rigid angular elbow shape including another attachment end, a second mating surface, another cable ingress/egress end and an outer thread proximate to said another attachment end, wherein said external circumferential indentation is rotatably engaged by an inwardly facing protrusion of a gland nut and said gland nut includes an inner thread that engages with said outer thread;

rotationally positioning said first and second cylindrical sleeve bodies to a desired angle to align said inner thread of said gland nut with said outer thread of said second cylindrical sleeve body;

inserting a wire through said ingress end to said egress end; and rotating said inner thread around said outer thread to pull said first and second mating surfaces of said first and second sleeve bodies together to restrain further torsional movement thereof.

* * * * *

UNITED STATES PATENT AND TRADEMARK OFFICE
CERTIFICATE OF CORRECTION

PATENT NO. : 7,394,021 B2
APPLICATION NO. : 11/710831
DATED : July 1, 2008
INVENTOR(S) : Joey D. Magno, Jr.

It is certified that error appears in the above-identified patent and that said Letters Patent is hereby corrected as shown below:

Column 7, line 49, replace "...scope of the and claims, which..." with --...scope of the claims, which...--;

Column 8, line 29, claim 5, replace "...wherein said an o-ring gasket..." with --...wherein said o-ring gasket...--;

Column 9, line 5, claim 12, replace "...said an o-ring gasket..." with --...said o-ring gasket...--.

Signed and Sealed this

Ninth Day of September, 2008

JON W. DUDAS
*Director of the United States Patent and Trademark Office*